Dec. 2, 1969   W. C. NASON ET AL   3,481,505
SUPPORT SYSTEM FOR CRYOGENIC CONTAINERS (1)
Filed May 24, 1967   2 Sheets-Sheet 1
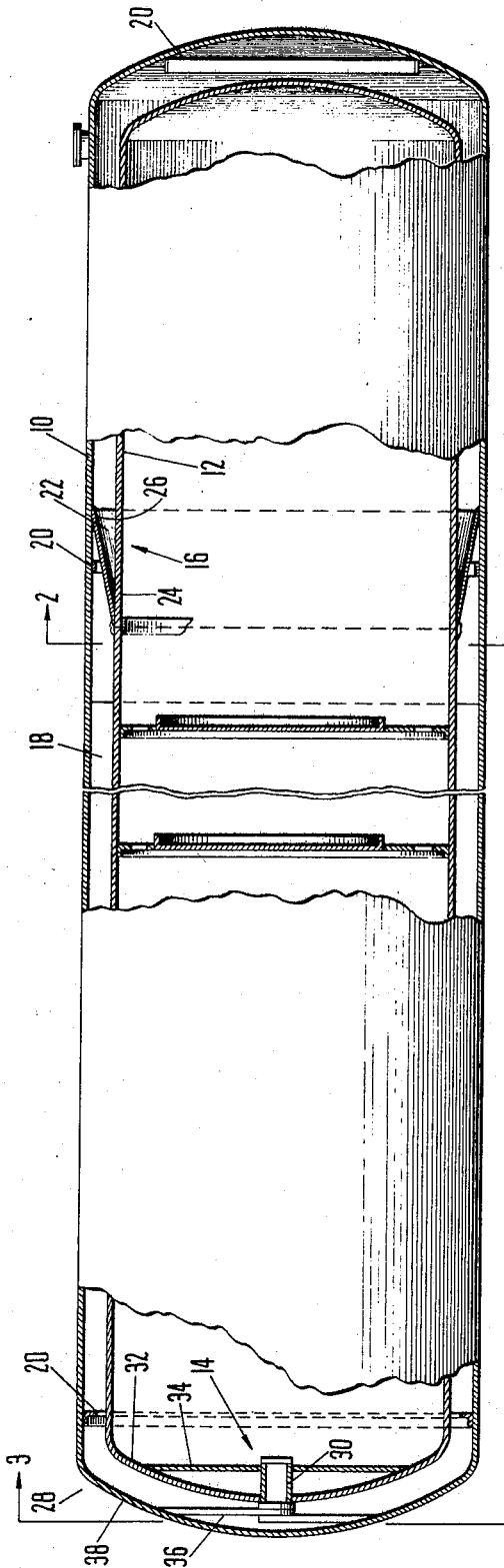
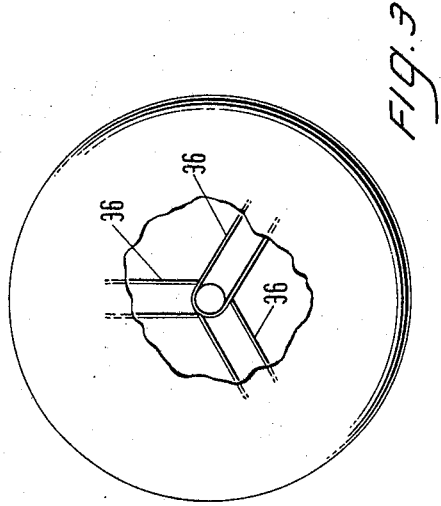
INVENTORS
Walter C. Nason
BY N. Nichols Latham
Wolf, Greenfield & Hieken United States Patent Office 3,481,505
Patented Dec. 2, 1969

3,481,505
SUPPORT SYSTEM FOR CRYOGENIC CONTAINERS (1)
Walter C. Nason, Arlington, and William Nichols Latham, Groveland, Mass., assignors to Process Engineering Inc., Plaistow Village, N.H., a corporation of New Hampshire
Filed May 24, 1967, Ser. No. 640,962
Int. Cl. B65d 25/02, 89/12
U.S. Cl. 220—15          4 Claims

ABSTRACT OF THE DISCLOSURE

A support for a cryogenic container wherein a truncated cone is secured at its smaller diameter end to the inner vessel of the container and the larger diameter end is secured to the outer vessel, intermediate the ends of the inner vessel, to carry axial and radial loads.

---

This invention relates to cryogenic containers and more particularly comprises a new and improved support system for the inner vessel of a mobile cryogenic container.

In the design of support systems for cryogenic containers, several criteria must be considered. These include the weight of the system, the efficiency of the heat path between the inner and outer vessels of the container, and the mechanical load that must be borne by the support. For many applications and particularly for those applications in which the weight of the liquified gas is relatively high, it is essential to reduce the weight of the support system for the inner vessel so as to achieve maximum net capacity with minimum gross weight of the container. For mobile containers, the maximum gross weight is imposed by police regulations which limit the load tonnage on the highway. Therefore, because the maximum gross weight is controlled, to maximize the payload of a mobile unit it is necessary to reduce the weight of the system.

The temperature difference between the inner and outer vessels may be in the range of 400° F., and it is evident therefore that any effective heat conducting path between the outer and inner vessels will result in the evaporation and loss of the cryogenic liquid contents of the inner vessel and thereby impair the performance of the cryogenic container. Because the conductivity of material is directly proportional to its cross sectional area, the cross sectional area of the inner vessel support must be small to minimize its ability to conduct heat to the inner vessel.

The requirement that the support system be capable of bearing the mechanical load is rather obvious. However, the stresses to which the support system are subjected are not so obvious. Certain stresses are caused by and occur during the shrinkage of the inner vessel during the cool-down period, while other stresses are imposed by relative movement of the inner and outer vessel caused by road motion etc. Thus, in designing the support system, adequate strength must be provided to sustain the mechanical load while the heat path and weight are minimized.

The support of the inner vessel intermediate its ends involves certain additional specific problems. The supports intermediate the ends must be capable of compensating for the thermal shrinkage both in a radial and axial direction. Moreover, the support itself must be capable of accommodating a temperature gradient of several hundred degrees F. between its inner and outer ends. Further, the support must be capable of deformation in order to limit the stresses which are imposed upon the walls of the inner and outer vessels when the inner vessel shrinks during the cooling period.

One important object of this invention is to provide a support for an inner vessel in a cryogenic container, which provides the necessary mechanical strength with a minimum heat path and minimum weight.

Another important object of this invention is to provide an intermediate support for the inner vessel of the cryogenic container which is capable of handling both the radial and axial loads without increasing the heat path.

To accomplish these and other objects, the support structure of this invention includes a continuous truncated cone having its inner or smaller diameter end secured to the inner vessel intermediate the inner vessel ends and having its outer or larger diameter end connected to the inner surface of the outer vessel. The cone provides generally equal axial and radial support, and as it cools at its inner end it shrinks in conformity with the shrinkage of the inner vessel and the cone becomes shorter and consequently steeper and provides the necessary radial support. The symmetry of the cone enables it to withstand sideways and vertical shock load with equal facility.

These and other objects and features of this invention along with its incident advantages will be better understood and appreciated by the following detailed description of one embodiment thereof, selected for purposes of illustration and shown on the accompanying drawing, in which:

FIG. 1 is a side view, partly in section, of a cryogenic container constructed in accordance with this invention;

FIGS. 2 and 3 are cross sectional views taken along the corresponding section line in FIG. 1.

Figure 4:
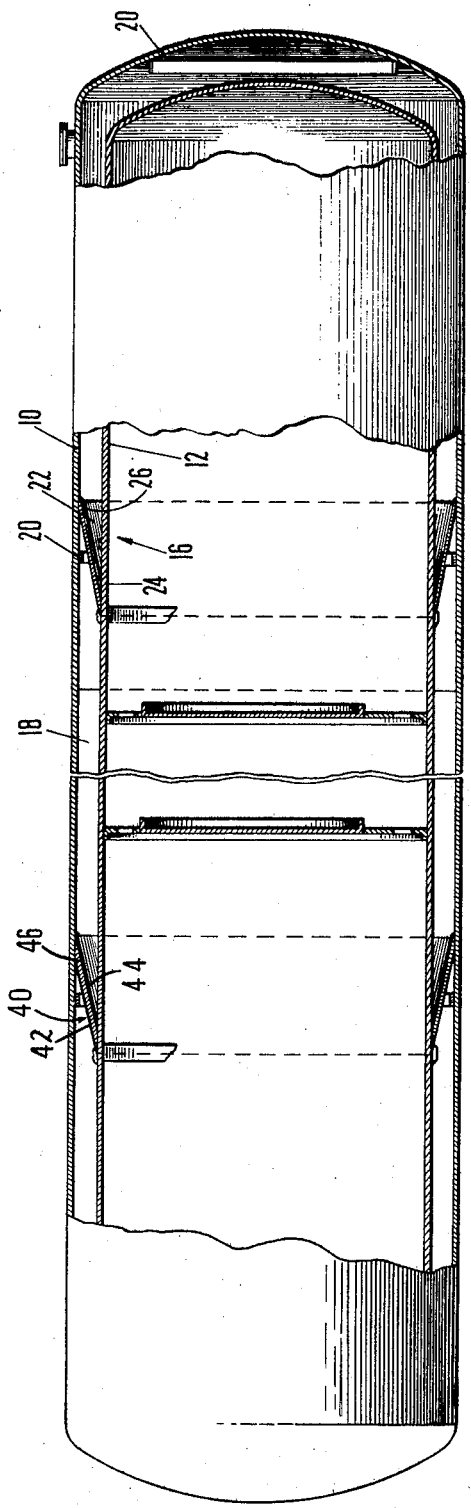
FIG. 4 is a side view similar to FIG. 1 and showing another embodiment of this invention.

In FIG. 1 a cryogenic container is shown comprising coaxial outer and inner vessels 10 and 12 respectively, each disposed horizontally, with the inner vessel carried by an end support structure 14 and an intermediate support structure 16. The support structures 14 and 16 carry the inner vessel 12 with its outer surface spaced from and defining a cavity 18 with the inner surface of the outer vessel. A number of stiffening rings 20 are secured to the inner surface of the outer vessel 10 and resist deformation of that vessel when the cavity 18 is evacuated. The present invention is particularly concerned with the support 16 intermediate the ends of the vessels.

In FIGS. 1 and 2, the support structure 16 is shown to comprise a truncated cone 22 welded at its inner end 24 to the outer surface of the vessel 12 and similarly welded at its outer end 26 to the inner surface of the outer vessel 10. The cone 22 may be made of stainless steel or some other material having like structural and thermal properties for providing radial and axial support and thermal insulation for the inner vessel. In the embodiment shown, the support structure 16 is located approximately two-thirds of the way back from the front end 28 of the container, and the cone cooperates with the support 14 which provides an additional vertical load bearing support for the inner vessel.

In FIG. 1 the support structure 14 is shown to include a tube 30 carried by the head 32 and plate 34 of the inner vessel 12 and which extends outwardly beyond the head 32 through an opening provided for that purpose. The end of the tube disposed outwardly of the head 32 is supported by three generally radial U-shaped straps 36 which extend to the head 38 of the outer vessel. The straps 36 are disposed 120° apart, and it will be appreciated that they support the inner vessel against radial displacement in any direction with respect to the outer vessel. A certain axial resilience is imparted to the inner vessel by the strap supports so as to permit some axial displacement of the inner vessel such as occurs during cooling. It is to be understood that the details of the end support 14 form no part of the present invention.

The use of a cone as shown in the intermediate structure 16 meets all the requirements of a good support structure as previously discussed and provides a number of advantages over support structures of other design currently used in the industry. Inherent in the cone design is a much higher beam strength and much greater degree of buckling stability relative to other structures of similar size and weight. Furthermore, due to its continuous nature, a cone eliminates the areas of high stress concentration which in other designs have been a continuous source of difficulty at the anchorage points of the structure to the inner and outer vessels.

Also inherent to a cone support structure is the fact that a single structural element, the cone, can provide both axial support as well as radial support in all directions, thus replacing as many as six separate supporting elements in some designs currently in use.

Another unique feature of the cone is that so long as the cone and inner vessel materials are the same and thus have the same coefficient of thermal expansion there will be practically no thermal stresses introduced into the cone as a result of the shrinkage of the inner vessel when put into service or due to the thermal gradient along the length of the cone. This is achieved by the axial, straight line elements of the cone taking on a slightly curved shape when they are cooled to operating temperature.

From the foregoing description it will be appreciated that the cone 22 which provides the intermediate support for the inner vessel is capable of providing adequate mechanical strength with a minimum heat path between the two vessels. Moreover, its thin cross section limits its weight and enables the single cone-shaped member to provide both the vertical and axial support required. Thus, it makes a minimum contribution to gross weight of the machine.

From the foregoing it will be evident that the cone shaped support 22 while particularly well suited for cryogenic container trailers, is in fact suitable for use in all forms of cryogenic containers with their axes either horizontal or vertical. Moreover, the cone-shaped support is capable of functioning with secondary supports such as the end support 14 and in certain instances it may be used alone. It also may be used with one or more additional cone-shaped supports. In such a case, the other cone-shaped supports would have one end fixed to the vessel wall, and the other end would serve as a bearing to slide relative to the other vessel to accommodate changes in their respective lengths.

In FIG. 4 a cryogenic container is shown similar to the embodiment of FIG. 1 but including a secondary cone shaped support 40 used with a primary cone shaped support 16 identical to that of FIG. 1. In this embodiment, the inner vessel 12 is secured to the inner edge 42 of the secondary truncated cone 44 while the outer end 46 of the truncated cone is slidable on the inner surface of the outer vessel 10. Thus, the secondary support 40 provides radial support for the inner vessel 12 in the outer vessel but provides for relative axial motion of the two vessels to accommodate changes in their respective lengths.

What is claimed is:
1. A support system for a cryogenic container comprising:
   an outer vessel having a cylindrical wall and closed ends,
   an inner vessel having a cylindrical wall disposed in and spaced from the cylindrical wall of the outer vessel,
   a truncated cone connected at its smaller diameter directly to the outer surface of the inner vessel and connected at its outer diameter directly to the outer vessel,
   and a second truncated cone supporting the inner vessel in the outer vessel,
   one end of the second truncated cone being fixed with respect to one of the vessels and the other end being slidable with respect to the other vessel.
2. A support system as defined in claim 1 further characterized by:
   said truncated cones being made of stainless steel and being secured by welding to the respective vessels.
3. A support system as defined in claim 1 further characterized by:
   said cylinders being oriented with their axes substantially horizontal.
4. A support system as defined in claim 1 further characterized by:
   said truncated cones being continuous.

References Cited
UNITED STATES PATENTS

| | | | |
|---|---|---|---|
| 2,858,136 | 10/1958 | Rind | 220—15 X |
| 2,198,315 | 4/1940 | Nyberg | 220—15 |
| 3,037,657 | 6/1962 | Hampton et al. | 220—15 |
| 3,163,313 | 12/1964 | Reynolds et al. | 220—9 X |
| 3,191,794 | 6/1965 | Perkins | 220—14 |
| 3,191,795 | 6/1965 | Molnar | 220—14 |

JOSEPH R. LECLAIR, Primary Examiner
JAMES R. GARRETT, Assistant Examiner